United States Patent [19]

Shattes et al.

[11] 3,800,414

[45] Apr. 2, 1974

[54] METHOD OF FABRICATING A HOLLOW COMPOSITE SUPERCONDUCTING STRUCTURE

[75] Inventors: Walter J. Shattes, Bloomfield; William G. Marancik, Basking Ridge; Bradley S. Kirk, Warren, all of N.J.

[73] Assignee: Air Reduction Company, Incorporated, New York, N.Y.

[22] Filed: Oct. 12, 1972

[21] Appl. No.: 297,135

Related U.S. Application Data

[62] Division of Ser. No. 36,741, May 13, 1970, Pat. No. 3,708,606.

[52] U.S. Cl. .............................. 29/599, 174/DIG. 6

[51] Int. Cl. .............................. H01v 11/00

[58] Field of Search ........ 29/599; 174/126 CP, 128, 174/DIG. 6; 335/216

[56] References Cited

UNITED STATES PATENTS

| | | | |
|---|---|---|---|
| 3,641,665 | 2/1972 | Matricon | 29/599 |
| 3,603,715 | 9/1971 | Eilhardt et al. | 174/126 CP |
| 3,639,672 | 2/1972 | Kafka | 174/128 X |
| 3,487,538 | 1/1970 | Kakizaki | 29/599 |
| 3,623,221 | 11/1971 | Morton et al. | 29/599 |
| 3,626,585 | 12/1971 | Hammer | 29/599 |
| 3,730,967 | 5/1973 | Nicol | 174/126 CP |

FOREIGN PATENTS OR APPLICATIONS

| | | | |
|---|---|---|---|
| 1,503,956 | 12/1967 | France | 174/DIG. 6 |

*Primary Examiner*—Charles W. Lanham
*Assistant Examiner*—D. C. Reiley, III
*Attorney, Agent, or Firm*—Donald J. Fitzpatrick; H. Hume Mathews; Edmund W. Bopp

[57] ABSTRACT

A core element comprising superconducting strands in a normally conducting matrix is initially extruded in a desired cross-sectional shape or configuration; and is then interposed in a prefabricated or postfabricated tube, and coreduced to a final product of desired dimensions, thus providing a matrix having a plurality of longitudinal internal channels. The core elements may assume a variety of cross-sectional shapes, such as ribbon, square, cross, triangle, star, annulus, etc., or a composite of these. In an alternative process, a cable is formed by twisting or braiding together a plurality of superconducting matrix wires, prior to coreduction in a prefabricated or postfabricated tube. In another form, a superconducting matrix strip is welded to form a tube. In a variation of this, superconductor wires are interposed in longitudinal slots in a billet of normally conducting material which is rolled into a ribbon, alternatively formed into a tube. The product of any of these techniques is finally coreduced to a wire which is formed into a coil which may be cooled internally by a forced cooling system including fluid or superfluid helium.

15 Claims, 18 Drawing Figures

FIG. 8A
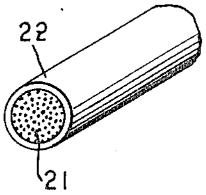
FIG. 8B
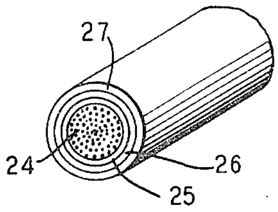
FIG. 8C
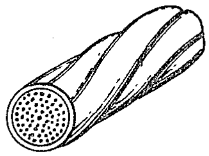
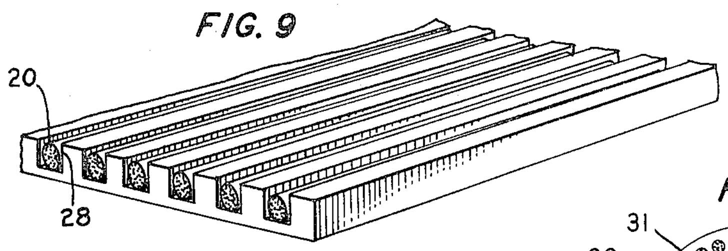
FIG. 9
FIG. 10B
FIG. 10A
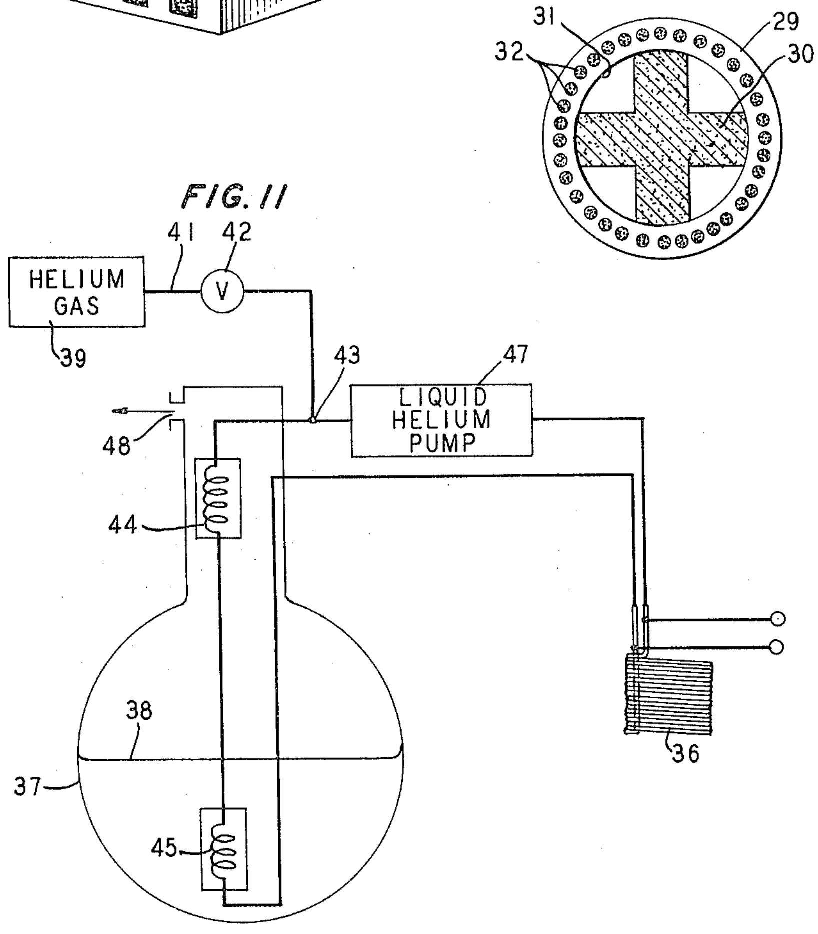
FIG. 10A, FIG. 11

METHOD OF FABRICATING A HOLLOW COMPOSITE SUPERCONDUCTING STRUCTURE

This is a division of application Ser. No. 36,741, filed May 13, 1970, now U.S. Pat. No. 3,708,606.

BACKGROUND OF THE INVENTION

In order to maintain superconducting materials in the temperature environment necessary for operation, they are usually submersed in a bath of boiling liquid helium. Liquid helium at normal pressure has been found to be a poor medium for cryostatic systems requiring forced circulation of the coolant. However, pressurized normal (or supercritical) liquid, or superfluid, helium have been found to be an excellent coolant in forced circulation, or forced convection systems.

A most advantageous cooling system is one in which the superconductor wires are constructed to include lengthwise pores or channels through which fluid or superfluid helium can be pumped in a forced circulation system to bring it into direct contact with the superconductor.

Although prior art systems have been developed utilizing supercritical helium and various conductor configurations, construction of suitable wires of this form, having optimum superconductive characteristics, requires expensive and cumbersome processes. Moreover, it has been found that certain of the superconductive configurations employed in the prior art have less than optimum current carrying characteristics, and have poor directional characteristics, exhibiting a substantial degree of anisotropy.

Accordingly, it is a primary object of the present invention to provide for the construction with greater facility of higher quality superconductor wires, particularly of a type including channels for low temperature fluid or superfluid helium. Another object of the invention is to provide channeled superconductive wires of a configuration of improved electrical characteristics in which anisotropy is reduced. Another object is to provide superconductor configurations having better heat transfer characteristics. A still further object of the invention is to provide for the manufacture of longer lengths of superconductive wire with greater facility, and of a type which tolerates twisting without fracture.

BRIEF DESCRIPTION OF THE INVENTION

These and other objects are attained in accordance with the present invention by a unique type of wire construction for use in the superconducting coil of a forced convection helium cooling system. This wire may comprise a core element including a matrix of normally conducting material containing fine superconducting strands, the core being performed to a pre-selected cross-sectional shape, such as, for example, a ribbon, square, triangle, star, annulus, etc. or combination of the same; and which is ultimately interposed in a prefabricated or postfabricated tube, and coreduced or sink drawn to a final reduced cross-sectional wire product which contains lengthwise channels or pores.

In one alternative form, the core comprises a cable formed of a plurality of superconductive matrix wires braided or twisted together, with each other or with normally conducting strands, before being placed in a tube for further processing. In another alternative form, a superconductive matrix strip is welded at the long edges to form a tube, or placed inside an external tube comprising normally conducting material. A tube may be formed from ribbon made from a billet of normally conducting material which has been slotted to accommodate a wire of superconductive matrix material.

The product wire, after final cold or hot working and heat treatment, is used to form a coil, through the channeled interior of which helium is pumped in a forced convection cooling operation.

Particular advantages of the processes and products of the present invention are that the wire can be conveniently fabricated in longer lengths than in prior art processes. The various configurations provide for better heat transfer, and in most cases, for reducing anisotropy. Moreover, the composite strands of superconductor and matrix material can be readily twisted, prior to installation as core elements or prior to fabrication as enclosing tube elements, providing improved electrical characteristics.

These and other objects, features, and advantages will be apparent to those skilled in the art from a study of the detailed specification hereinafter with reference to the attached drawings, in which:

BRIEF DESCRIPTION OF THE DRAWINGS

FIG. 8A shows a round wire element of superconductive matrix material enclosed in a thin copper coating;

FIG. 8B shows a wire element of superconductive matrix material having a plurality of coatings, including a coating of cupro-nickel sandwiched between two thin coatings of copper;

FIG. 8C shows a wire of the form of FIGS. 8A or 8B, which has been twisted;

FIG. 9 shows a slab of normally conducting material, including multiple longitudinal slots into which are interposed rods of the form of FIGS. 8A, 8B, or 8C;

FIG. 10A shows, before reduction, a tube made from a slotted slab of the form of FIG. 9 by standard tube processes;

FIG. 10B shows the configuration of FIG. 10A after reduction; and

FIG. 11 shows in schematic a forced cooling system employing a coil of superconductive wire formed in accordance with the present invention.

DETAILED DESCRIPTION OF THE DRAWINGS

Figure 1:
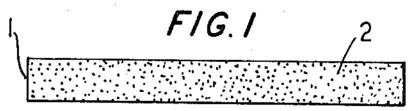
FIG. 1 shows a matrix of a normally conducting material, including strands of superconducting material, which have been coreduced in an initial process.

Referring in detail to FIG. 1 of the drawings, there is shown in cross-sectional view, a matrix 1 of normally conducting material, including a large number of strands 2 of superconducting material. In the present illustration, the matrix 1 may comprise a ribbon of the order of 50 mils thick, 125 mils wide, and of indeterminate length, containing of the order of 100 strands of superconducting material, each strand having a cross-sectional dimension of, say, 4 to 5 mils.

This product may be fabricated by any one of several different processes well-known in the art in which, for example, a plurality of superconducting rods inserted in normal conducting tubes are packed together in a preselected configuration inside of a cylindrical shell of normally conducting material several inches in diameter. This is then evacuated and sealed. The evacuated, sealed billet is then processed by a combination of hot and cold working steps to a product of desired cross-sectional dimension and electrical characteristics. Such a process is described in detail on page 46 of a book entitled *Manufacture and Properties of Steel Wires* by Anton Pomp, published by The Wire Industry, Ltd., London (1954).

For the purposes of the present invention, the superconducting material may comprise, for example, an alloy ranging in composition from 60% niobium, 40% titanium to 40% niobium, 60% titanium. In the present illustrative embodiment the superconductor material is niobium titanium in an alloy consisting of essentially 55 weight per cent niobium and 45 weight per cent titanium. This is formed from what is known in the art as electron beam niobium and crystal bar titanium, the total alloy containing oxygen to the amount of about 200 – 1,000 parts per million, the remaining impurities, not including oxygen, being under about 0.11 per cent by weight. It will be understood that in the fabrication of alternative embodiments, other alloys can be employed in different proportions of niobium and titanium, such as, for example, an alloy consisting essentially of 44 weight per cent niobium and 56 weight per cent titanium, having an oxygen content of about 600 parts per million and having impurities, not including oxygen, of less than about 0.15 per cent by weight. It is contemplated that any material known as Class II or a "hard" superconductor, may be used for the purposes of the present invention.

In the present example, it is contemplated that the normally conducting material may consist of what is known in the art as "certified oxygen free high conductivity copper," known by the trademark OFHC Brand Copper, and described in detail in a technical survey entitled "OFHC Brand Copper High Conductivity Oxygen Free Copper," copyright 1957, available from The American Metal Company Ltd., 61 Broadway, New York, N.Y. Alternatively, it is contemplated that other normally conducting materials may be used for this purpose such as, for example, aluminum, gold, or silver.

In accordance with another alternative, the core element may comprise strands of superconductive material in a matrix comprising high resistance normally conducting material, such as alloys of cupro nickel or German silver. In a convenient form, strands of niobium titanium encased in copper sleeves are embedded in a matrix of cupro-nickel alloy, constructed in the manner disclosed in U.S. Pat. No. 3,710,000 issued to W. Shattes and W. Marancik on Jan. 9, 1973.

Figure 2:
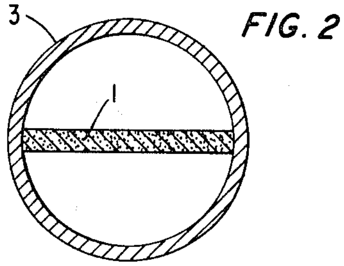
FIG. 2 shows, in cross-section, a combination, before reduction, of a superconducting matrix element of the form indicated in FIG. 1, interposed in a tube of normally conducting material.

Assuming that the material prepared in the manner previously described has been reduced to the cross-sectional dimensions indicated in FIG. 1, such an element, which may be in the form of a ribbon as much as 1,200 feet long, may be then interposed in a tube, 3 as shown in FIG. 2, which may be of, say, OFHC Brand Copper which in the present example is 30 mils in wall thickness and ⅝ inches in outer diameter. Alternatively, the outer tube 3 can comprise aluminum, stainless steel, or in fact any metal having the requisite strength and relative conductivity. In addition to being a single integral tube, say 30 mils thick, it can alternatively comprise a laminate of a plurality of tubes of lesser thickness fitted together coaxially. For example, an outer tube of stainless steel can be welded to an inner tube of, say, copper to provide additional strength.

The structure, as indicated, may be reduced in cross-section about 20% by what is known in the art as "sink drawing," in which cold working is applied to uniformly reduce the diameter of the outer tube to crimp it about the inner superconducting matrix element. The principal object of this step is to fasten the core element to the inner wall of the enclosing tube in such a manner as to form good mechanical, thermal and electrical contact. The composite is then cold worked through one or more dies until the resulting product is of the order of 50 to 80 mils in cross-section and may be shaped either to have a rectangular or circular cross-section, depending on the type of die through which it is drawn in the final processing steps. The inner or core element 1 need not necessarily be a single piece, but can comprise a laminate of layers from 2 to 25 mils thick, and each 125 mils wide. These may be superposed to form a single integral element or may be separated.

Figure 3A:
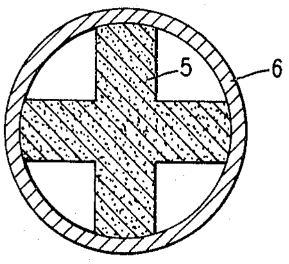
FIGS. 3A and 3B show variations of the combination of FIG. 2, before reduction, in which the superconducting core element interposed in the tube has a cruciform or polygon cross-section.
Figure 3B:
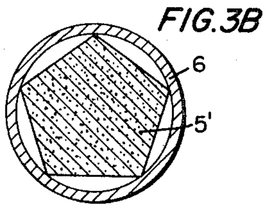

In accordance with another alternative, instead of the central element 1 being of the form of a ribbon, it may be processed by metal working techniques well-known in the art including drawing it through dies which will give it a final cross-sectional configuration in the form of a cross, such as, for example, shown as element 5 in FIG. 3. The latter, in a manner similar to that indicated in FIG. 2, is interposed into a tubular shell 6 of normally conducting material which may be of a thickness and form similar to that indicated with reference to FIG. 2. Like the element previously shown, this may also be sink drawn to reduce it to the desired cross-section. It will be apparent that the core cross-section may assume many variations, such as rectangles, triangles, and other polygons, and stars of various shapes.

Figure 5A:
FIGS. 5A and 5B show the general cross-sectional appearance of the final form to which the configurations of FIGS. 2 and 3 respectively may be reduced.
Figure 5B:
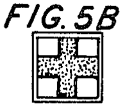
Figure 4:
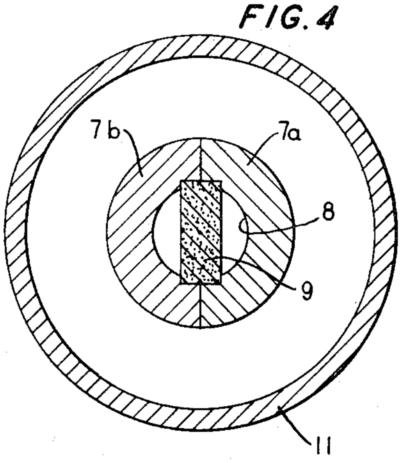
FIG. 4 is a further variation of the elements of FIGS. 2 and 3, in which the core element interposed in the tube takes the form of two annular halves of normally conducting material, which close together to hold in place a diametrically-disposed ribbon of superconducting material.

Another alternative may be, for example, of the form indicated in FIG. 4 of the drawings, in which the core element is a composite formed of two doughnut-shaped halves 7*a*, 7*b* of copper or other normally conducting material of the order of, say, ⅝ inches in outer diameter and having an inner diameter opening 8, say, ⅜ inches across. The two halves 7*a*, 7*b* accommodate between them a strip or ribbon 9 running lengthwise and bifurcating the chamber formed by the inner opening 8. The ribbon 9 comprises a matrix element of superconducting material of the general form indicated in FIG. 1. The composite comprising the annular halves 7*a*, 7*b* and ribbon separator is interposed, in the manner indicated with reference to the previous figures, in an outer tube 11 of normally conducting material, having an outer diameter of 0.750 inches, and a wall thickness of about 30 mils, which is processed in the manner previously described by sink drawing it to conform to the outer diameter of the annular halves 7*a*, 7*b* with a reduction of about 20% in area. By cold working, the composite is ultimately reduced to a cross-sectional dimension of 50 to 80 mils, which may be either circular or rectangular, in the manner indicated in FIGS. 5A and 5B of the drawings, depending on well-known metal working techniques.

Figure 6A:
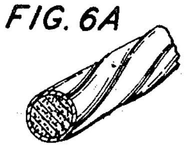
FIGS. 6A and 6B show a single strand twist, and multiple strand twist which can be assumed by the core elements of FIGS. 2, 3 and 4.
Figure 6B:
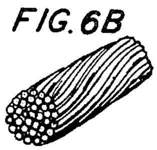

As indicated in FIGS. 6A and 6B of the drawings, in accordance with a preferred alternative, the inner core member, comprising the element 1 of FIG. 2, the element 5 of FIG. 3, and the element 9 of FIG. 4, may be twisted, as shown in FIG. 6A of the drawings, before it is rolled or passed through a die for forming in the desired shape for assembling in the enclosing cylinder, in each case. For example, it is contemplated that the pitch of twists may vary from several feet to one-tenth of an inch. In a further alternative form, shown in FIG. 6B, the core elements 1, 5 and 9 in FIGS. 2, 3 and 6, respectively, may comprise multistrand twists, in which strands of superconductive matrix wire are twisted together, or with strands of normal conductor. It has been found that the finer the superconductor filaments, the more electrically stable is the configuration.

In a further alternative, the twisted super conductive matrix, as shown in FIGS. 6A and/or 6B, may be first rolled into a flat sheet, and joined such as by welding with a metal sheet of other compositions to form a laminate. The laminate may then be formed into a tube of laminar construction with the superconductive matrix forming the innermost layer. The tube formation may be accomplished by drawing. The outer laminate is desirably a relatively stronger metal intended to afford desired structural properties and may be made from a sheet of normally conducting material or preferably, a stronger metal such as stainless steel. The tube then formed may be used as a hollow superconductive wire or may be substituted for the outer tubes disclosed in FIGS. 2, 3, 4, 7 or variations of these.

Figure 7A:
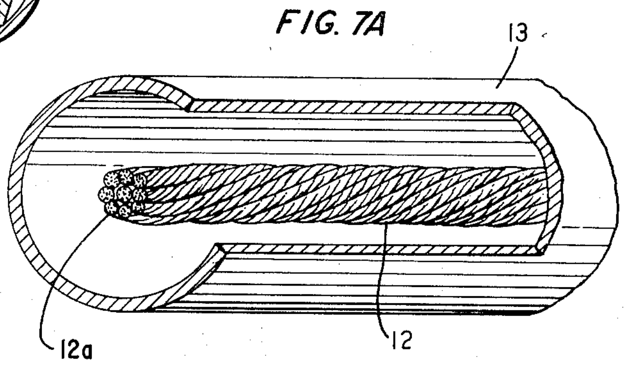
FIGS. 7A and 7B show a further alternative form of the invention in which the central superconductive matrix comprises a plurality of wires of the type shown in FIGS. 6A or 6B, braided together.
Figure 7B:
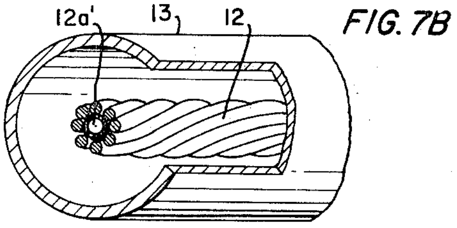

An additional modification is shown in FIGS. 7A and 7B of the drawings. In FIG. 7A a plurality of wires of composite superconducting matrix material of the type described with reference to FIG. 1 of the drawings, each having a cross-sectional diameter of about 0.1 inch, are braided together in spiral fashion as shown in FIG. 6B to form a cable 12 about 0.450 inches in diameter. This braid may comprise only a few strands, or many strands, and may be intermixed with strands of normally contuctive material. The spiral may have a pitch of from several feet to about 1/10 inch. As with the other embodiments, this may be interposed into an enclosing outer tube 13 which is 0.75 inches in diameter and about 30 mils thick, and sinkdrawn and further processed, as previously described, to the desired shape and cross-section. In a variation of this embodiment, the central or core wire 12A of the cable can be substantially larger than the peripheral wires which may be wound about it at varying pitches and using various numbers of strands from as few as one to up to 19. In another variation, as shown in FIG. 7B core 12A may comprise a tube.

In accordance with a further variation of the invention, wires or rods of superconductive matrix material of the form indicated in FIG. 8A, having a solid central element 21 formed in the manner indicated with reference to the matrix element of FIG. 1, is coated with a thin coating 22 of normally conducting material, such as a copper coating 0.001 inches thick. A variation is shown in FIG. 8B, in which the central superconductive matrix element 24, which may be 0.050 inches in diameter, includes an inner coating of copper 25, which is 0.001 inches thick, an intermediate coating of cupronickel 26 which is 0.001 inches thick, and an outer coating of copper 27 which is 0.001 inches thick. Either of the elements shown in FIGS. 8A or 8B can, in the case of a preferred alternative, be twisted as shown in FIG. 8C.

Elements 20 of the form of any of those shown in FIGS. 8A, 8B or 8C are then interposed, as shown in FIG. 9, into a series of longitudinal slots 28 which are 0.05 inches wide and 0.07 inches deep, parallel to the long edges of a rectangular slab of normally conductive material, such as copper, say, 2 inches wide and 1 inch thick, and of indeterminate length.

This is cold worked and rolled to a thickness of 0.080 inches and a length of about, say, 1,200 feet. It can then be formed by welding the edges by tube-making processes well-known in the art, to form a tube 29, such as indicated in FIG. 10A, having an outer diameter of 0.5 inches and an inner channel 31, say 0.340 inches diameter, and discrete islands 32 of superconductive matrix material. It is contemplated that a composite core element 30, having a cruciform cross-section, and similar to core element 5 of FIG. 3, and preferably twisted, may be interposed inside of the tubular shell 29, before coreduction to the form shown in FIG. 10B. It will be understood that the element 30 can also assume any of the forms shown on FIGS. 2, 3, and 4, or other forms, such as rectangles, triangles, stars, and other polygons. The form of FIG. 10A may be reduced by the usual cold working techniques to an annular element of the form shown in FIG. 10B, having an outer diameter of 0.400 inches.

It is contemplated that wire formed in accordance with the specifications set forth hereinbefore may be embodied in the coil element 36 of a forced cooling convection system employing supercritical fluid helium, such as shown in FIG. 11 of the drawings. This comprises a Dewar type vessel 37, properly insulated in the manner known in the art to maintain the helium at the desired temperature and pressure. Vessel 37 is partially filled with a bath of liquid helium 38. Helium gas is initially introduced into the system from a source 39 through the line 41 and cryogenic valve 42 to the junction 43, from which it flows through the heat exchanger 44 interposed in the neck of the vessel, and heat exchanger 45, submersed in the liquid helium, to coil 36 comprising hollow superconductive wire of one of the types described with reference to the earlier figures. The helium circulated through this circuit by the action of the liquid helium pump 47 is brought to a temperature of the liquid bath 38, ie; 4.2° Kelvin, in the heat exchanger 45, subsequently cooling down the superconductive coil 36. The heat exchanger 44 functions to partly recuperate the enthalpy of helium vapors exhausted through vent 48 in the top of the vessel. Helium in the closed loop including heat exchangers 44 and 45 and coil 36 is maintained at high pressure, whereas pump 47 is required to produce only a small pressure drop for recirculation in the circuit. Until equilibrium is reached, helium is introduced continuously from the source 39, valve 42 being closed when equilibrium is reached. Details of such a system are disclosed in an article entitled "Construction of a Superconducting Test Coil Cooled by Helium Forced Circulation" by M. Morpurgo of Cern, Geneva, Switzerland, reprinted from N. P. Division Report CERN 68-17 (1968).

The test coil 36 may, for example, have the form indicated in the above-named article.

The superconducting strands formed in accordance with the present invention have been found to have a current carrying capacity of $1 \times 10^5$ amps./cm.$^2$ at a field of 60 kilogauss. In addition, the forms shown in FIGS. 3 and 7 are substantially isotropic in their behavior.

We claim:

1. The method of forming internally channelled superconducting wire which comprises the steps of:

preforming a matrix of normally conducting material containing a plurality of strands of superconducting material by mechanically reducing said matrix into a structure of preselected cross-sectional shape having an elongation in one dimension which exceeds said cross-sectional dimension by many orders of magnitude, wherein the said strands run substantially parallel to said principal direction of elongation, utilizing material comprising said preformed matrix as a core element and an outer tube of normal material to form a tubular composite containing a channel in said direction of elongation, and further reducing said tubular composite to channelled wire of a preselected cross-section.

2. The method in accordance with claim 1 wherein said preformed matrix is twisted prior to utilizing said matrix to form said tubular composite.

3. The method in accordance with claim 2 wherein said outer tube is of substantially larger cross-section in at least one direction than the cross-sectional dimension of said preformed matrix, and said outer tube is sink drawn to form a composite with said core element.

4. The method in accordance with claim 2 wherein a preselected shape from the group of shapes including ribbon, cruciform, polygon, annular, or a combination of these is impressed on said preformed core element prior to interposing said core in said tube.

5. The method in accordance with claim 3 wherein said core element is preformed as a ribbon of normal and superconducting material clamped between two semiannular inner tube halves comprising normally conducting material to form a tubular element having a pair of substantially symmetrically disposed longitudinal channels, and said tubular element is interposed in an outer tube which is sink drawn thereto.

6. The method in accordance with claim 5 wherein said inner tube halves are formed of a matrix of normal and superconductive material.

7. The method in accordance with claim 3 wherein said outer tube is formed by laminating an inner layer of copper to a peripheral layer of steel.

8. The method in accordance with claim 3 wherein said outer tube is formed by laminating to a peripheral layer of steel an inner layer comprising said prereduced matrix of normally conducting material containing a plurality of strands of superconducting material.

9. The method in accordance with claim 8 wherein said inner layer of prereduced matrix material is twisted prior to forming said outer tube.

10. The method in accordance with claim 3 wherein said core element is preformed as a braid of a plurality of twisted strands comprising said preformed matrix of normal and superconducting material.

11. The method in accordance with claim 10 wherein said braid is formed about a central axial element substantially larger in diameter than the other components of said braid.

12. The method in accordance with claim 11 wherein said central axial element is tubular.

13. The method in accordance with claim 3 wherein said enclosing tube is formed by the steps comprising:

preforming wire comprising a plurality of superconductive strands in a matrix of normally conductive material, forming a plurality of substantially parallel longitudinal slots in a slab of normally conducting material, interposing pieces of said preformed wire in a plurality of said slots, rolling said slab including said wire pieces to substantially reduce the cross-sectional dimension of said slab, forming said tube by welding together the longitudinal edges of said rolled slab, and further reducing the cross-section of said tube to form said internally channelled superconducting wire.

14. The method in accordance with claim 13 wherein said wire is twisted prior to interposing said wire in said slots.

15. The method in accordance with claim 13 wherein said wire pieces are coated with an undercoating of copper, an intermediate coating of cupro-nickel, and an outer coating of copper, prior to being interposed in said slots.

* * * * *